(12) United States Patent
Nishizawa et al.

(10) Patent No.: US 8,462,289 B2
(45) Date of Patent: Jun. 11, 2013

(54) DISPLAY DEVICE

(75) Inventors: Shigeki Nishizawa, Mobara (JP);
Nobuyuki Koganezawa, Chiba (JP);
Fuimiyuki Sato, Kamogawa (JP)

(73) Assignees: Hitachi Displays, Ltd., Chiba-ken (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 12/923,480

(22) Filed: Sep. 23, 2010

(65) Prior Publication Data

US 2011/0019129 A1 Jan. 27, 2011

Related U.S. Application Data

(63) Continuation of application No. 12/216,209, filed on Jul. 1, 2008, now Pat. No. 7,920,223.

(30) Foreign Application Priority Data

Jul. 10, 2007 (JP) .................................. 2007-180890

(51) Int. Cl.
*G02F 1/1333* (2006.01)

(52) U.S. Cl.
USPC ............................... 349/58; 349/64; 349/160

(58) Field of Classification Search
USPC ............................................ 349/64, 58, 160
See application file for complete search history.

(56) References Cited

U.S. PATENT DOCUMENTS

| | | | |
|---|---|---|---|
| 5,194,973 A | 3/1993 | Isogai et al. |
| 5,975,703 A | 11/1999 | Holman et al. |
| 6,359,668 B1 | 3/2002 | Iijima et al. |
| 6,738,111 B2 | 5/2004 | Kawata |
| 6,953,735 B2 | 10/2005 | Yamazaki et al. |
| 7,060,591 B2 | 6/2006 | Yamazaki et al. |
| 7,074,644 B2 | 7/2006 | Kimura |
| 7,184,027 B2 | 2/2007 | Sato et al. |
| 7,190,503 B2 | 3/2007 | Ide |
| 7,199,855 B2 | 4/2007 | Yoshimi et al. |
| 7,368,307 B2 | 5/2008 | Cok |
| 7,446,339 B2 | 11/2008 | Yamazaki et al. |

(Continued)

FOREIGN PATENT DOCUMENTS

| JP | 2002-203414 | 7/2002 |
|---|---|---|
| JP | 2006-106603 | 4/2006 |

OTHER PUBLICATIONS

H. Sato et al., "A4-Sized Liquid Crystal Displays with Flexible Light Guide Plate", International Display Workshop (IDS), 2006, pp. 605-608.

*Primary Examiner* — Edward Glick
*Assistant Examiner* — Sang V Nguyen
(74) *Attorney, Agent, or Firm* — Stites & Harbison PLLC; Juan Carlos A. Marquez, Esq.

(57) ABSTRACT

A liquid crystal display panel formed by using a TFT substrate and a color filter substrate is polished to decrease the thickness thereof so that it can be curved. The liquid crystal display panel and various optical sheets are sandwiched between a frame forming a curved surface and a light guide plate forming a curved surface, to thereby form a curved surface. An upper polarizer plate and a lower polarizer plate are, respectively, sandwiched between the surface cover and the liquid crystal display panel, and between the liquid crystal display panel and the optical sheet, and are not adhered or are partly adhered to the liquid crystal display panel.

5 Claims, 7 Drawing Sheets

U.S. PATENT DOCUMENTS

| | | |
|---|---|---|
| 7,492,347 B2 | 2/2009 | Sato et al. |
| 7,703,226 B2 | 4/2010 | Schnuckle |
| 2002/0027636 A1 | 3/2002 | Yamada |
| 2002/0180712 A1 | 12/2002 | Sato et al. |
| 2003/0025118 A1 | 2/2003 | Yamazaki et al. |
| 2003/0062519 A1 | 4/2003 | Yamazaki et al. |
| 2003/0112213 A1* | 6/2003 | Noguchi et al. ............... 345/96 |
| 2003/0134488 A1 | 7/2003 | Yamazaki et al. |
| 2004/0021413 A1 | 2/2004 | Ito et al. |
| 2005/0117197 A1* | 6/2005 | Ide ............................. 359/291 |
| 2005/0156907 A1 | 7/2005 | Sato et al. |
| 2005/0156908 A1* | 7/2005 | Sato et al. .................... 345/173 |
| 2005/0164470 A1* | 7/2005 | Yamazaki et al. ............ 438/455 |
| 2006/0216909 A1* | 9/2006 | Yamazaki et al. ............ 438/457 |
| 2006/0273304 A1* | 12/2006 | Cok ............................... 257/40 |
| 2007/0146569 A1* | 6/2007 | Nouchi et al. .................. 349/58 |
| 2008/0034627 A1 | 2/2008 | Schnuckle |
| 2008/0034628 A1 | 2/2008 | Schnuckle |
| 2008/0067931 A1 | 3/2008 | Ito et al. |
| 2008/0137027 A1 | 6/2008 | Tashiro et al. |
| 2008/0188157 A1 | 8/2008 | Tashiro et al. |
| 2008/0299859 A1 | 12/2008 | Paolini, Jr. et al. |
| 2009/0115933 A1* | 5/2009 | Mimura ......................... 349/59 |
| 2009/0124062 A1 | 5/2009 | Yamazaki et al. |
| 2010/0124603 A1 | 5/2010 | Ito et al. |

\* cited by examiner

DISPLAY DEVICE

CROSS-REFERENCE TO RELATED APPLICATION

The present application is a Continuation of U.S. application Ser. No. 12/216,209 filed on Jul. 1, 2008 now U.S. Pat No. 7,920,223. Priority is claimed from U.S. application Ser. No. 12/216,209 filed on Jul. 1, 2008, which claims priority from Japanese application 2007-180890 filed on Jul. 10, 2007, the content of which is hereby incorporated by reference into this application.

BACKGROUND OF THE INVENTION

This invention relates to a liquid crystal display device and, particularly, to a liquid crystal display device having a display screen which is forming a curved surface.

Owing to their advantages for realizing the display devices in decreased thicknesses and in decreased weights, the liquid crystal display devices are finding spreading demands from displays for computers through cell phone terminals up to TVs. A flat screen is one of the features of the liquid crystal display devices, too.

Further, taking the advantage for decreasing the thickness, study has been forwarded to develop the liquid crystal display device as a flexible display. A development of this kind has been disclosed in, for example, "non-patent document 1". The "non-patent document 1" has the following description. Namely, a liquid display panel is formed by holding ferroelectric liquid crystals dispersed in a polymer between two pieces of plastic substrates, and maintaining a gap between the substrates by using polymer poles. In this case, the back light, too, must be formed flexible. According to the "non-patent document 1", this is realized by providing an LED by the side of the flexible light guide plate.

[Non-patent document 1] H. SATO et al., "A4-Sized LCDs with Flexible Light Guide Plate", International Display Workshop (IDW), '06.

SUMMARY OF THE INVENTION

The object of developing a flexible liquid crystal display, so far, is to make the display itself flexible. The "non-patent document 1" discloses forming a flexible liquid crystal display panel by using a plastic substrate made from a plastic material accompanied, however, by many problems in regard to reliability when operated for extended periods of time, that must be solved. When it is attempted to form the back light flexible, on the other hand, the light guide plate or the diffusing plate, too, must be formed flexible leaving a problem of the necessity for developing the material therefor which is reliable.

In the fields of amusement, portable use where the viewing position is fixed in many cases and display mounted on a vehicle, a display having a curved surface is required for improving legibility. This invention is to realize a display having a curved surface by using a liquid crystal display panel based on a glass substrate like in the prior art without using the plastic substrate mentioned above.

The display having a curved surface used for cell phones and the like must have a decreased thickness over the display device as a whole. However, neither the liquid crystal display panel nor the back light needs to be flexible. In the display having a curved display screen used for amusement and the like, on the other hand, neither the liquid crystal display panel nor the back light needs to be flexible, and the display device as a whole is little urged to be thinly formed.

This invention realizes a display having a curved surface by constituting a TFT substrate and a color filter substrate using a glass, the glass plates having a thickness not larger than a predetermined value, and elastically curving the liquid crystal display panel. The invention will be concretely described below.

(1) A liquid crystal display device comprising a TFT substrate forming pixel electrodes and TFTs, a color filter substrate forming a color filter, a liquid crystal display panel of which the liquid crystals are sandwiched between the color filter substrate and the TFT substrate, a frame covering the peripheries of the liquid crystal display panel to hold the liquid crystal display panel, and a back light; wherein the frame has a curved surface, and the liquid crystal display panel has a curved surface defined by the curved surface of the frame; and the TFT substrate and the color filter substrate are formed of a glass, an upper polarizer plate is sandwiched between the color filter substrate and the frame without being adhered to the color filter substrate, and a lower polarizer plate is sandwiched between the TFT substrate and the back light without being adhered to the TFT substrate.

(2) The liquid crystal display device described in (1), wherein the back light has a light guide plate or a diffusing plate, and a curved surface of the light guide plate or the diffusing plate on the side facing the liquid crystal display panel is in agreement with the curved surface of the liquid crystal display panel.

(3) The liquid crystal display device described in (1) or (2), wherein the back light has a light guide plate or a diffusing plate and optical sheets, a dented portion is formed in the light guiding plate or in the diffusing plate, the optical sheets are held in the dented portion, and a curved surface of the dented portion on the side facing the liquid crystal display panel is in agreement with the curved surface of the liquid crystal display panel.

(4) The liquid crystal display device described in any one of (1) to (3), wherein the curved surface of the liquid crystal display panel is of a concave shape as viewed from the side opposite to the back light.

(5) The liquid crystal display device described in any one of (1) to (4), wherein the curved surface of the liquid crystal display panel and the curved surface of the light guide plate or the diffusing plate on the side opposite to the liquid crystal display panel, are of a convex shape.

(6) The liquid crystal display device described in any one of (1) to (5), wherein when the thickness of the liquid crystal display panel is denoted by t, the radius of curvature R of the curved surface of the liquid crystal display panel has a relationship R>400t.

(7) The liquid crystal display device described in any one of (1) to (5), wherein when the thickness of the liquid crystal display panel is denoted by t, the radius of curvature R of the curved surface of the liquid crystal display panel has a relationship R>800t.

(8) A liquid crystal display device comprising a TFT substrate forming pixel electrodes and TFTs, a color filter substrate forming a color filter, a liquid crystal display panel of which the liquid crystals are sandwiched between the color filter substrate and the TFT substrate, a transparent surface cover covering the liquid crystal display panel, a frame covering the peripheries of the surface cover and of the liquid crystal display panel to hold the liquid crystal display panel, and a back light; wherein the frame has a curved surface, and the liquid crystal display panel has a curved surface defined by the curved surface of the frame; and the TFT substrate and the color filter substrate are formed of a glass, an upper polarizer plate is sandwiched between the color filter substrate and the surface cover without being adhered to the color filter substrate, and a lower polarizer plate is sandwiched between the TFT substrate and the back light without being adhered to the TFT substrate.

(9) The liquid crystal display device described in (8), wherein the back light has a light guide plate or a diffusing plate and optical sheets, a dented portion is formed in the light guide plate or in the diffusing plate, the optical sheets are held in the dented portion, and a curved surface of the dented portion on the side facing the liquid crystal display panel is in agreement with the curved surface of the liquid crystal display panel.

(10) The liquid crystal display device described in (8) or (9), wherein the curved surface of the liquid crystal display panel is of a concave shape as viewed from the side opposite to the back light.

(11) The liquid crystal display device described in (8) to (10), wherein the curved surface of the liquid crystal display panel and the curved surface of the light guide plate or the diffusing plate on the opposite to the liquid crystal display panel, are of a convex shape.

(12) The liquid crystal display device described in (8) to (11), wherein when the thickness of the liquid crystal display panel is denoted by t, the radius of curvature R of the curved surface of the liquid crystal display panel has a relationship R>400t.

(13) The liquid crystal display device described in (8) to (11), wherein when the thickness of the liquid crystal display panel is denoted by t, the radius of curvature R of the curved surface of the liquid crystal display panel has a relationship R>800t.

(14) A liquid crystal display device comprising a TFT substrate forming pixel electrodes and TFTs, a color filter substrate forming a color filter, a liquid crystal display panel of which the liquid crystals are sandwiched between the color filter substrate and the TFT substrate, a frame covering the peripheries of the liquid crystal display panel to hold the liquid crystal display panel, and a back light; wherein the frame has a curved surface, and the liquid crystal display panel has a curved surface defined by the curved surface of the frame; and the TFT substrate and the color filter substrate are formed of a glass, an upper polarizer plate is sandwiched between the color filter substrate and the frame being partly adhered to the color filter substrate, and a lower polarizer plate is sandwiched between the TFT substrate and the back light being partly adhered to the TFT substrate.

(15) The liquid crystal display device described in (14), wherein the back light has a light guide plate or a diffusing plate and optical sheets, a dented portion is formed in the light guide plate or in the diffusing plate, the optical sheets are held in the dented portion, and a curved surface of the dented portion on the side facing the liquid crystal display panel is in agreement with the curved surface of the liquid crystal display panel.

(16) A liquid crystal display device comprising a TFT substrate forming pixel electrodes and TFTs, a color filter substrate forming a color filter, a liquid crystal display panel of which the liquid crystals are sandwiched between the color filter substrate and the TFT substrate, a transparent surface cover covering the liquid crystal display panel, a frame covering the peripheries of the surface cover and of the liquid crystal display panel to hold the liquid crystal display panel, and a back light; wherein the frame has a curved surface, and the liquid crystal display panel has a curved surface defined by the curved surface of the frame; and the TFT substrate and the color filter substrate are formed of a glass, an upper polarizer plate is sandwiched between the color filter substrate and the surface cover being partly adhered to the color filter substrate, and a lower polarizer plate is sandwiched between the TFT substrate and the back light being partly adhered to the TFT substrate.

(17) The liquid crystal display device described in (16), wherein the back light has a light guide plate or a diffusing plate and optical sheets, a dented portion is formed in the light guide plate or in the diffusing plate, the optical sheets are held in the dented portion, and a curved surface of the dented portion on the side facing the liquid crystal display panel is in agreement with the curved surface of the liquid crystal display panel.

(18) A liquid crystal display device comprising a TFT substrate forming pixel electrodes and TFTs, a color filter substrate forming a color filter, a liquid crystal display panel of which the liquid crystals are sandwiched between the color filter substrate and the TFT substrate, a frame covering the peripheries of the liquid crystal display panel to hold the liquid crystal display panel, and a back light; wherein the frame has a curved surface, and the liquid crystal display panel has a curved surface defined by the curved surface of the frame; and the TFT substrate and the color filter substrate are formed of a glass, an upper polarizer plate is adhered to the color filter substrate, a lower polarizer plate is adhered to the TFT substrate, and the curved surface of the liquid crystal display panel has a radius of curvature of not smaller than 200 mm.

(19) The liquid crystal display device described in (18), wherein the curved surface of the liquid crystal display panel has a radius of curvature of not smaller than 400 mm.

(20) The liquid crystal display device described in (20), wherein the back light has a light guide plate or a diffusing plate and optical sheets, a dented portion is formed in the light guide plate or in the diffusing plate, the optical sheets are held in the dented portion, and a curved surface of the dented portion on the side facing the liquid crystal display panel is in agreement with the curved surface of the liquid crystal display panel.

According to the invention, the liquid crystal display device having a curved screen is produced by using a glass substrate making it possible to realize a display device featuring high reliability and excellent legibility. According to the invention, further, the liquid crystal display device having a curved display screen is obtained by using parts which are basically little different from the conventional constituent parts, offering advantage not only in reliability but also in cost.

According to the invention, further, the liquid crystal display device having a curved display screen and featuring excellent legibility can be used for a variety of displays. Moreover, the invention makes it possible to easily produce a display having a curved surface which is concave outwardly. Therefore, the invention solves the problem of viewing angle range of the liquid crystal display device, and displays a vivid and legible image on the whole screen of even a large size.

DESCRIPTION OF THE PREFERRED EMBODIMENTS

Detailed contents of the invention will now be disclosed according to embodiments.

Embodiment 1

Figure 1:
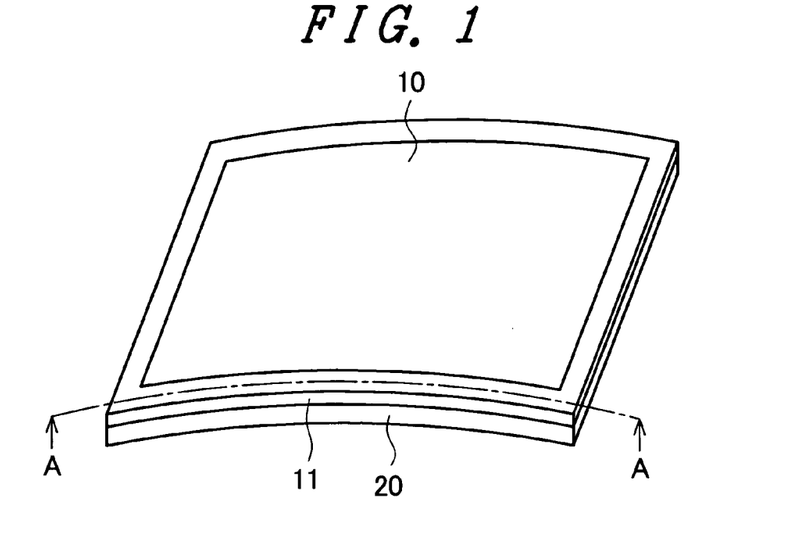
FIG. 1 is a schematic view of a liquid crystal display device of an embodiment 1.

FIG. 1 is a view of appearance of a crystal display device of an embodiment 1. FIG. 1 shows a display in which the screen is formed convex outwardly. The display device of this kind is used for amusement purposes, e.g., used in the game machines such as slot game machines. In FIG. 1, a liquid crystal display panel 10 is curved outwards. The liquid crystal display panel 10 curved outwards includes a substrate which in this embodiment is formed by using a glass. That is, the glass substrate is formed having a decreased thickness enabling the liquid crystal display panel 10 to be easily curved, and is held in a frame 11 having a curved surface to thereby form the liquid crystal display panel 10 having a curved screen. Though not shown in FIG. 1, the upper side of the liquid crystal display panel 10 is covered with a transparent surface cover 8. That is, the surface cover 8 is provided between the frame 11 and the liquid crystal display panel 10.

In FIG. 1, the liquid crystal display panel 10 is covered with the frame 11 except the display potion. A back light 20 is laid on the back surface of the liquid crystal display panel 10. As will be described later, the back light 20 is constituted by various optical parts and a source of light.

If the liquid crystal display panel 10 having a curved screen could be formed by using a glass substrate, then the conventional technology for producing liquid crystals can be utilized, which is very advantageous in cost and reliability. To what extent the glass can be curved is determined depending upon the thickness of the glass plate.

Figure 2A:
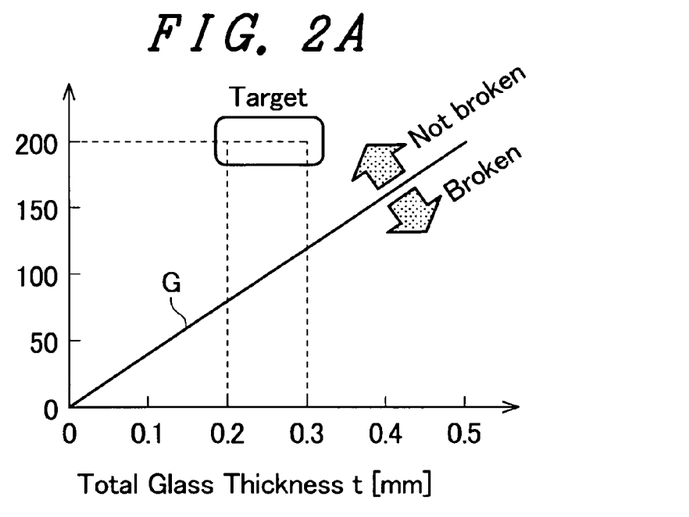
FIGS. 2A and 2B are graphs illustrating a relationship between the radius of curvature and the thickness of the glass.
Figure 2B:
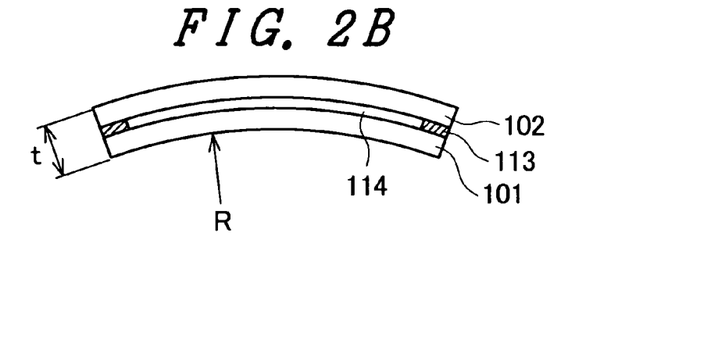

FIG. 2A is a graph illustrating a relationship between the thickness of the liquid crystal display panel 10 and the curvature within a range where the glass is not broken. FIG. 2B is a view illustrating a parameter in FIG. 2A. Referring to FIG. 2B, the liquid crystal display panel 10 includes a TFT substrate 101 on which TFTs and pixel electrodes are formed, and a color filter substrate 102 on which a color filter and the like are formed. Liquid crystals are sandwiched between the TFT substrate 101 and the color filter substrate 102, and are sealed with a sealing member 113.

The mother glass substrate used for the liquid crystal display panel has been standardized like, for example, 0.7 mm or 0.5 mm. Therefore, when it is attempted to decrease the thickness of the glass substrate to impart curvature to it, the liquid crystal display panel 10 is formed and, thereafter, the outer side of the glass substrate is polished to decrease the thickness. Polishing is done relying upon both the mechanical polishing and the chemical polishing. In this case, both the TFT substrate 101 and the color filter substrate 102 are polished. The liquid crystal layer 114 is several microns thick, which can be neglected if the total thickness t of the liquid crystal display panel 10 is brought into consideration.

In FIG. 2A, the ordinate represents the radius of curvature of the liquid crystal display panel 10. Referring to FIG. 2B, the curvature is defined by the radius of curvature R on the inner side of the liquid crystal display panel 10. The glass thickness on the abscissa of FIG. 2A stands for the total thickness t of the liquid crystal display panel 10. That is, when the abscissa in FIG. 2A represents 0.2 mm, the thickness of the TFT substrate 101 or the color filter substrate 102 is 0.1 mm.

In FIG. 2A, the straight line G represents a limit line of breakage of the glass. In the region under the straight line G, the glass substrate breaks. In the region over the straight line G, the glass substrate does not break. If the radius of curvature is denoted by R and the thickness of the liquid crystal display panel 10 by t, the straight line G has a relationship $R=400t$. That is, if the radius of curvature R becomes smaller than 400 times of the thickness, then the glass substrate breaks. If scars are present in the glass, however, the glass breaks even slightly over the straight line G. It is, therefore, desired that the practical products are imparted with margin twice as large as the straight line G so as to be used on a straight line of $R=800t$ or in a region over the straight line. Concerning the relationship of the glass substrate and the curvature, therefore, the product of this embodiment is set well over the straight line G as shown in FIG. 2A.

If a large radius of curvature is allowed, the thickness of the glass substrate does not have to be so decreased. In this case, therefore, an upper polarizer plate 103 may be stuck to the color filter substrate 102 and a lower polarizer plate 104 may be stuck to the TFT substrate 101. For example, if the thickness of the TFT substrate 101 and the color filter substrate 102 in combination is not smaller than 0.5 mm, then the polarizer plates can be stuck to the glass substrate. According to FIG. 2A, the radius of curvature corresponding to the plate thickness of 0.5 mm is 200 mm. If a margin twice as great as the straight line G is to be imparted, the radius of curvature becomes 400 mm.

Figure 3:
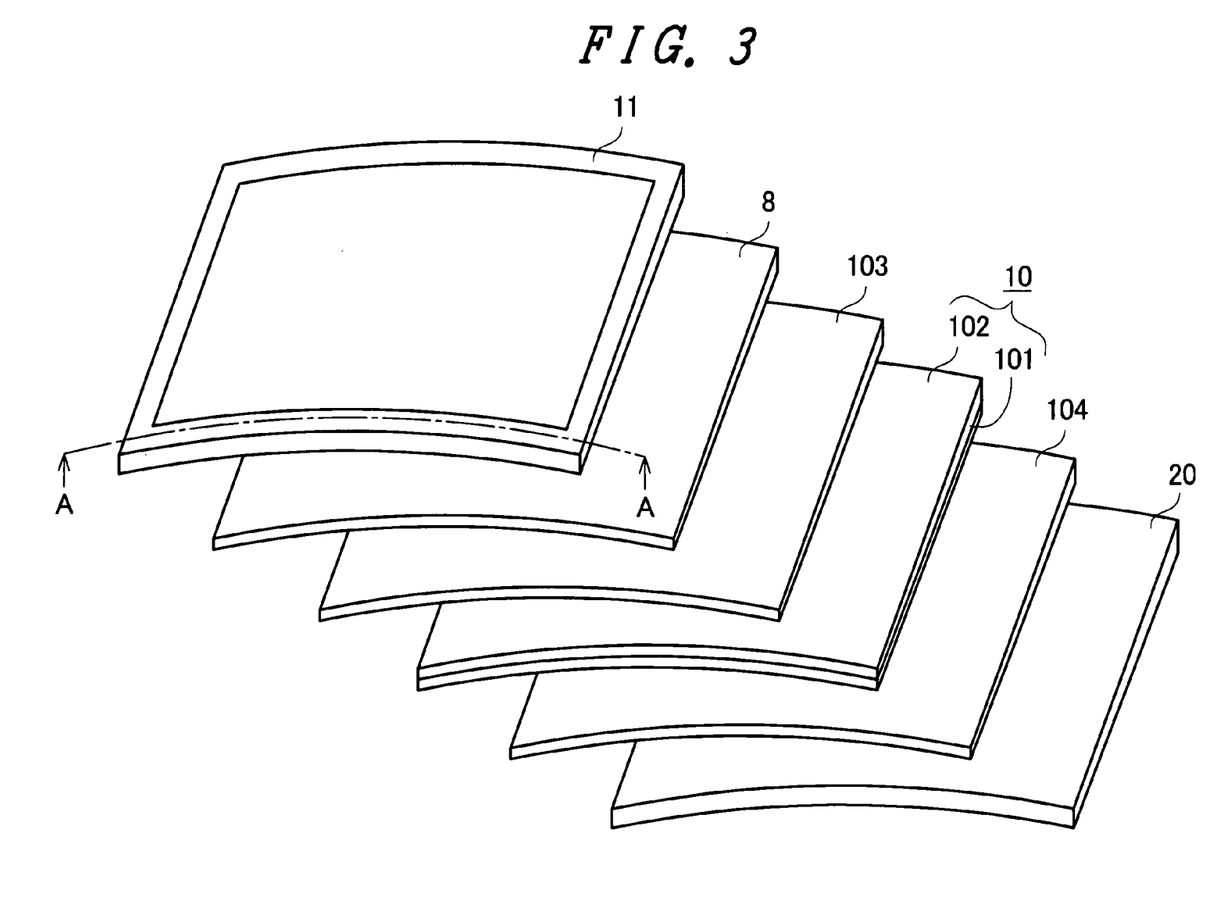
FIG. 3 is a disassembled perspective view of the liquid crystal display device of the embodiment 1.

FIG. 3 is a disassembled perspective view of the liquid crystal display device of the embodiment. In FIG. 3, the frame 11 is forming a curved surface. The display surface of the liquid crystal display panel 10 is curved along the curved surface of the frame 11. The frame 11, first, holds the surface cover 8. The surface cover 8 has the role of protecting the liquid crystal display panel 10 arranged thereunder.

The upper polarizer plate 103 is arranged under the surface cover 8. The liquid crystal display panel 10 constituted by the TFT substrate 101 and the color filter substrate 102 is arranged under the upper polarizer plate 103. The lower polarizer plate 104 is arranged under the liquid crystal display panel 10. In the ordinary liquid crystal display panel 10, the upper polarizer plate 103 is stuck to the color filter substrate 102, and the lower polarizer plate 104 is stuck to the TFT substrate 101. In this embodiment, however, the polarizer plates are not stuck to the glass substrate since the TFT substrate 101 and the color filter substrate 102 are polished to have a decreased thickness so that the liquid crystal display panel 10 can be curved.

If a defect is found in the step of inspecting the liquid crystal display panel 10, the polarizer plates that are once stuck must often be stripped off and the liquid crystal display panel 10 only must be regenerated. However, when the glass substrates are polished to decrease their thicknesses, the polarizer plates that are stripped off may often damage the TFT substrate 101 or the color filter substrate 102 so will not to be regenerated. Because of this reason in this embodiment, the polarizer plates are not stuck to the glass substrates.

The liquid crystal display panel 10 of a combination of the color filter substrate 102 and the TFT substrate 101 is arranged under the upper polarizer plate 103. As described above, the color filter substrate 102 and the TFT substrate 101 in the liquid crystal display panel 10 have been polished so as to have decreased thicknesses and so as to be curved. The lower polarizer plate 104 is arranged under the liquid crystal display panel 10.

The upper polarizer plate 103 and the lower polarizer plate 104 are fixed by being pushed onto the frame 11 by an optical member that constitutes a back light 20. The precision for assembling the liquid crystal display panel 10, the upper polarizer plate 103 and the lower polarizer plate 104 is determined by the inner diameter of the frame 11. The frame 11 is formed by using a metal and can be worked maintaining a sufficiently high precision. Further, both the upper polarizer plate 103 and the lower polarizer plate 104 can be cut maintaining a high precision. Therefore, the upper polarizer plate 103 and the lower polarizer plate 104 can be held in position in the liquid crystal display panel 10 maintaining precision in a practicable range.

Figure 4:
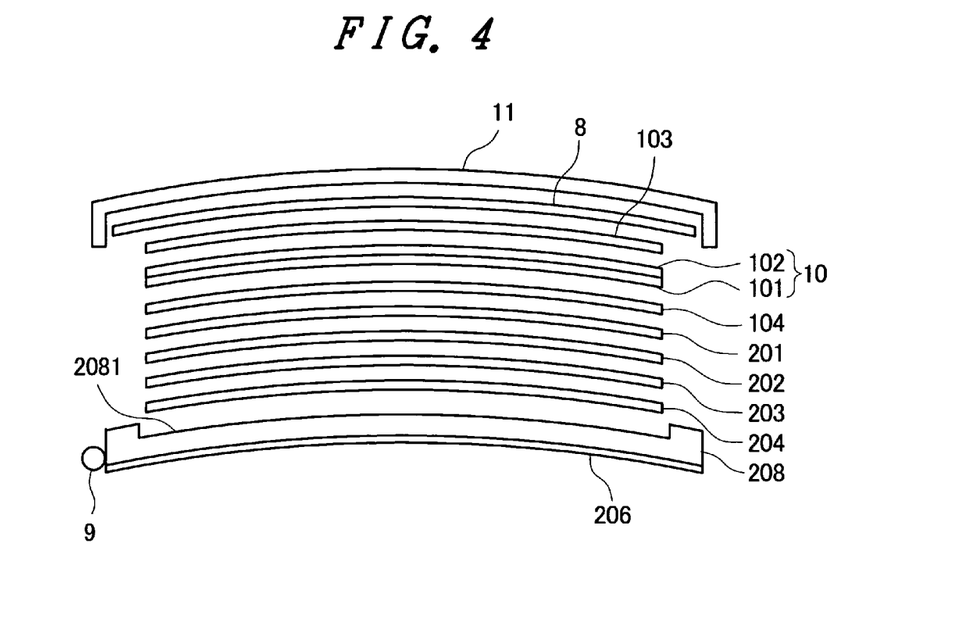
FIG. 4 is a sectional view illustrating in detail the liquid crystal display device of the embodiment 1.

The back light 20 is arranged under the lower polarizer plate 104. FIG. 4 illustrates in detail the back light. The back light 20 is constituted by a light guide plate 208, various optical sheets and the source of light. Among these parts, the surface on the upper side of the light guide plate 208 is curved to be the same as the curved display screen, and the light guide plate 208 is pushed onto the liquid crystal display panel 10, so that a predetermined curvature is imparted to the optical sheets, liquid crystal display panel 10 and surface cover 8.

FIG. 4 is a disassembled view along the section A-A in FIG. 1. In FIG. 4, edge portions of the frame 11 are seen. A predetermined curvature is imparted to the display portion of the liquid crystal display panel 10 relying on the curvature of the edge portions of the frame 11. The transparent surface cover 8 is arranged under the frame 11. The surface cover 8 protects the liquid crystal display panel 10. In this embodiment as described above, further, the upper polarizer plate 103 has not been stuck to the color filter substrate 102. Therefore, the upper polarizer plate 103 is fixed between the surface cover 8 and the liquid crystal display panel 10.

The polarizer plate is arranged under the surface cover 8. As described above, however, the polarizer plate has not been stuck to the TFT substrate 101 in the liquid crystal display panel 10. The liquid crystal display panel 10 is arranged under the upper polarizer plate 103. The glass substrates have been polished to assume decreased thicknesses, so that the liquid crystal display panel 10 forms a predetermined curved surface. That is, the liquid crystal display panel 10 has a flat surface at the time when it is produced. Upon being arranged in the frame 11, however, the liquid crystal display panel 10 forms a curved surface creating a screen having a predetermined curved surface. It needs not be pointed out that a relationship between the total thickness of the TFT substrate 101 and the color filter substrate 102 and the radius of curvature thereof must be on the upper side of the straight line G shown in FIG. 2A. The lower polarizer plate 104 is arranged under the liquid crystal display panel 10. The lower polarizer plate 104 is fixed being sandwiched between the liquid crystal display panel 10 and the optical sheets of the back light 20.

The back light 20 is arranged under the lower polarizer plate 104. The back light 20 is formed by using various optical sheets, light guide plate 208, LED 9 and the like. This embodiment uses the LED 9 as the source of light. The LED 9 is arranged by the side of the light guide plate 208. Upon arranging the LED 9 by the side, the thickness of the liquid crystal display device can be decreased. The light guide plate 208 plays the role of directing light from the LED 9 arranged by the side toward the liquid crystal display panel 10. Though the source of light is arranged by the side in FIG. 4, it may often be arranged under the optical part depending upon the display device. In this case, a diffusing plate is used for diffusing light instead of using the light guide plate.

A dented portion 2081 is formed in the upper surface of the light guide plate 208. The optical sheets are placed in the dented portion 2081 so as to be fixed for their positions. The dented portion 2081 formed in the upper surface of the light guide plate 208 is forming a curved surface which is the same as the curved surface of the screen of the liquid crystal display device. Upon pushing the liquid guide plate 208 onto the liquid crystal display panel 10 via the optical sheets, the screen of the liquid crystal display panel 10 forms a predetermined curved surface in compliance with the curved surface of the frame 11. The light guide plate 208 in this embodiment is a flat plate having a thickness of 2 mm. However, the light guide plate 208 does not have to possess a uniform thickness. For example, the upper surface of the light guide plate 208 may be curved in the same manner as the curved surface of the screen of the display device but the lower surface may be a flat surface. The light guide plate 208 is formed by using a polycarbonate and is rigid to some extent.

Of the light from the LED 9, the light heading toward the side opposite to the liquid crystal display panel 10 is reflected by a reflection sheet 206 and travels toward the liquid crystal display panel 10. The light going out of the light guide plate 208 transmits through a lower diffusing sheet 204. The lower diffusing sheet 204 plays the role of uniformalizing the light coming out of the light guide plate 208.

A lower prism sheet 203 is arranged on the lower diffusing sheet 204. A number of prisms are formed on the lower prism sheet 203 maintaining a predetermined pitch and extending in the transverse direction of the screen, and work to focus the light in a direction perpendicular to the screen of the liquid crystal display panel 10, the light tending to spread in the longitudinal direction of the screen from the back light 20. That is, use of the prism sheet increases the brightness on the front surface of the liquid crystal display device. An upper prism sheet 202 is arranged on the lower prism sheet 203. A number of prisms are formed on the upper prism sheet 202 maintaining a predetermined pitch and extending in a direction at right angles with the lower prism sheet 203, e.g., in the longitudinal direction of the screen. Therefore, the light from the back light 20 which is going to spread in the transverse direction of the screen is focused in a direction perpendicular to the surface of the liquid crystal display panel 10. Thus, by using the lower prism sheet 203 and the upper prism sheet 202, the light that is going to spread in the longitudinal and transverse directions of the screen is focused in the direction perpendicular to the screen.

An upper diffusing sheet 201 is arranged on the upper prism sheet 202. Prisms are formed on the prism sheet extending in a predetermined direction and maintaining a pitch of 50 µm. That is, dark and bright fringes are formed maintaining the pitch of 50 µm. The liquid crystal display panel 10, on the other hand, is forming scanning lines in the transverse direction of the screen maintaining a predetermined pitch or is forming data signal lines in the longitudinal direction of the screen. Therefore, dark and bright fringes are formed by the pitch of the scanning lines or by the pitch of the data signal lines. Namely, dark and bright fringes of the prisms and dark and bright fringes of the liquid crystal display panel 10 undergo interference and develop moire. The upper diffusing sheet 201 work to reduce the moire due to its diffusing action.

The above optical sheets are placed on the light guide plate 208. The optical sheets are as thin as several tens of microns to one hundred and several tens of microns, and assume the same curvature as that of the light guide plate 208 by simply being placed thereon. The liquid crystal display device, on the other hand, is held in the frame 11 and is pushed from the lower side by the back light 20 so as to assume nearly the same curvature as the curved surface formed in advance by the frame 11.

Figure 5:
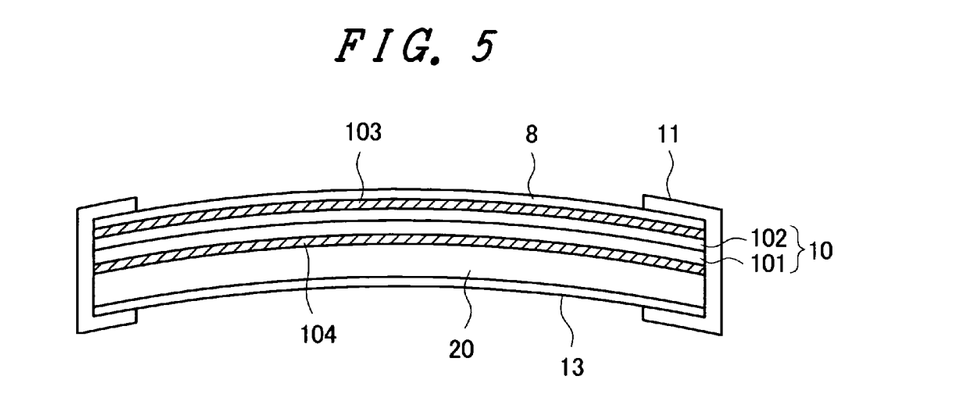
FIG. 5 is a sectional view illustrating a state of fixing the optical parts of the liquid crystal display device of the embodiment 1.

FIG. 5 illustrates a state where the upper polarizer plate 103 is fixed by being sandwiched by the transparent surface cover 8 and the color filter substrate 102, and the lower polarizer plate 104 is fixed by being sandwiched between the TFT substrate 101 and the back light 20. In FIG. 5, the back light 20 including the light guide plate 208 is pushed onto the liquid crystal display panel 10 from the side of a back cover 13 to thereby fix the optical member, liquid crystal display panel 10, upper polarizer plate 103 and lower polarizer plate 104.

The above example is when the polarizer plates are not stuck to the TFT substrate 101 or the color filter substrate 102 in the liquid crystal display panel 10. However, it may happen that the liquid crystal display panel 10 and the polarizer plates are not assembled maintaining sufficient precision due to insufficient precision of parts or any other problems. If the polarizer plates are stuck to the glass substrates of the liquid crystal display panel 10 like in the prior art, however, it becomes difficult to regenerate the liquid crystal display panel 10 in case defect has occurred.

Figure 6:
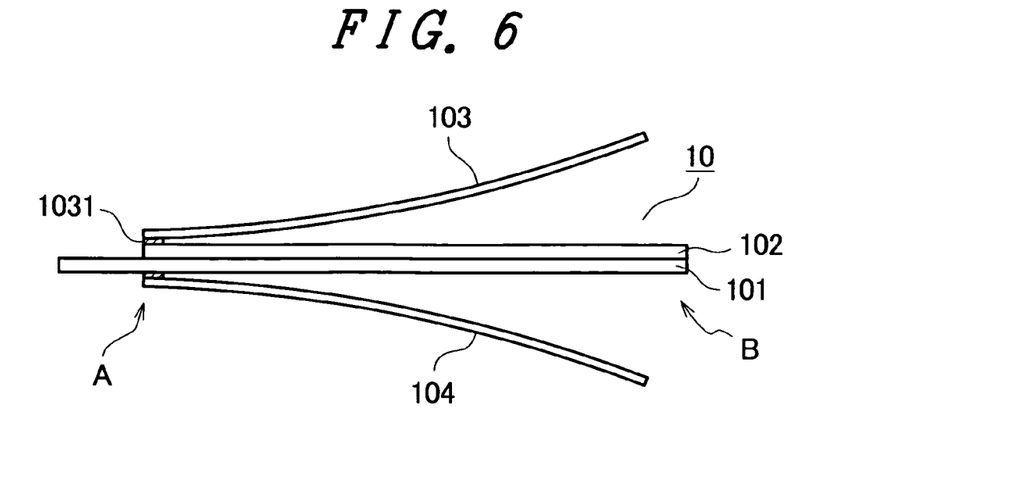
FIG. 6 is a view illustrating how to mount polarizer plates.

Referring to FIG. 6, the polarizer plates can be stably arranged by fixing parts of the polarizer plates to the color filter substrate 102 or the TFT substrate 101 via adhesive members or viscous members 1031. In this case, the positions to where the adhesives or the viscous members 1031 are attached are desirably the portions where the TFT substrate 101 and the color filter substrate 102 are overlapped one upon the other in the liquid crystal display panel 10. The portions where the two substrates are overlapped have a large strength and prevent the liquid crystal display panel 10 from being broken at the time of regeneration or when the polarizer plates are to be stripped off. In FIG. 6, the sticking members 1031 are arranged at a portion A but may be arranged at a portion B which is on the opposite side. Referring to FIG. 6, further, the upper polarizer plate 103 may be partly adhered onto the color filter substrate 102 to omit the transparent surface cover 8. The upper surface of the back light 20, too, is curved to be in agreement with the curvature of the liquid crystal display panel 10.

Of the optical members of the back light 20, the optical sheets are each as thin as several tens of microns to a hundred and several tens of microns and are arranged being overlapped. Therefore, the optical sheets do not seriously affect the gap between the source of light and the liquid crystal display panel 10. The light guide plate 208 is formed of a polycarbonate plate of a thickness of about 2 mm and is rigid to some extent. At the time of forming, the light guide plate 208 is formed so as to possess the same curvature as the curved surface of the screen of the liquid crystal display panel 10. The optical sheets are curved to comply with the light guide plate 208.

The light guide plate 208 uniformly emits light from the source of light present by the side thereof toward the liquid crystal display panel 10. For this purpose, a curved surface may be formed on the light guide plate 208 or a special reflection pattern may be formed on the light guide plate 208. In this embodiment, however, the curved surface on the upper side of the light guide plate 208 must be fixed to be in agreement with the curved surface of the liquid crystal display panel 10. To uniformly direct the light from the side of the light guide plate 208 to the liquid crystal display panel 10, therefore, the reflection pattern formed on the light guide plate 208 must be controlled or the shape of the curved surface on the lower side of the light guide plate 208 must be controlled.

[Embodiment 2]

The embodiment 1 has dealt with the case where the screen of the liquid crystal display device was convex outwards. The advantage of the invention utilizing the liquid crystal display device is that the liquid crystal display device can be formed even when the screen has a concave shape. When the screen has the concave shape, the liquid crystal display device exhibits its features more conspicuously.

Figure 7:
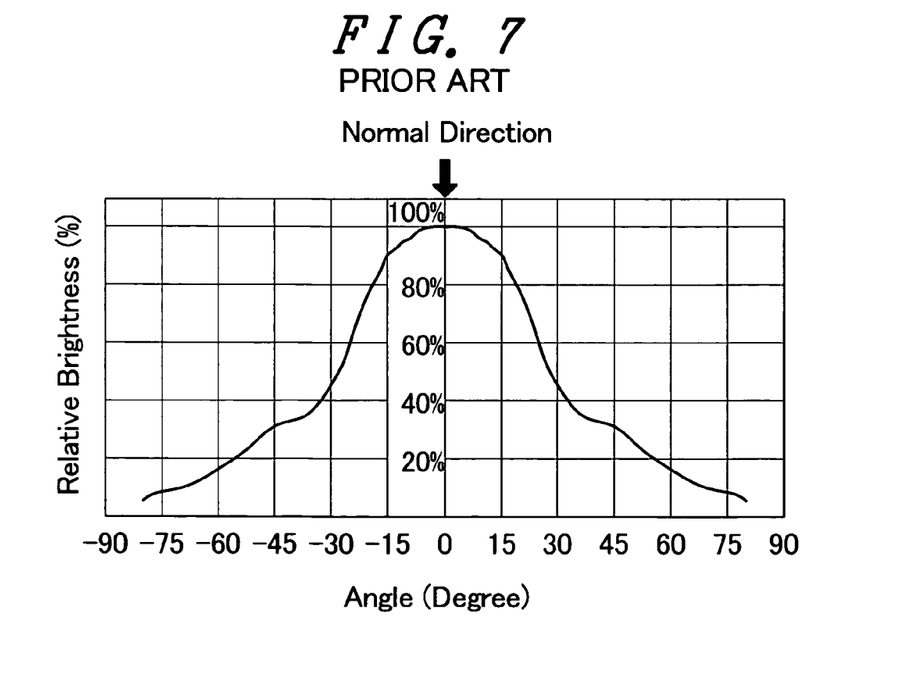
FIG. 7 is a graph illustrating viewing angle range characteristics of a liquid crystal display panel.

FIG. 7 illustrates viewing angle range characteristics of a general liquid crystal display panel having a flat display surface. One of the problems concerning the image quality of the liquid crystal display device is that the brightness and chromaticity vary depending upon the angle of viewing the screen. FIG. 7 illustrates viewing angle range characteristics of a liquid crystal display device of an ordinary TN system. In FIG. 7, the ordinate represents the brightness. The brightness of the screen when it is viewed from a direction perpendicular thereto is regarded to be 100%. In FIG. 7, the abscissa represents the angle of viewing the screen. That is, the angle is 0 degree when the screen is viewed from a direction perpendicular thereto, and the angle deviated from the perpendicular direction is plotted on the abscissa. As shown in FIG. 7, if the liquid crystal screen is viewed from an angle deviated by degrees from the perpendicular direction, the brightness decreases down to nearly 40%. Further, the brightness decreases for each of the colors leaving a problem in that the color varies depending upon the viewing angle range.

The viewing angle range characteristics vary depending upon the system of the liquid crystal display device. For example, the liquid crystals of the IPS (in plane switching) system which controls the transmission of light by rotating the liquid crystal molecules in a direction in parallel with the TFT substrate 101 exhibit superior viewing angle range characteristics to those of the liquid crystals of the ordinary TN system. In either case, when the screen is flat or is outwardly convex, the viewing angle range characteristics of the liquid crystal display panel 10 must be improved to meet the requirement.

Figure 8:
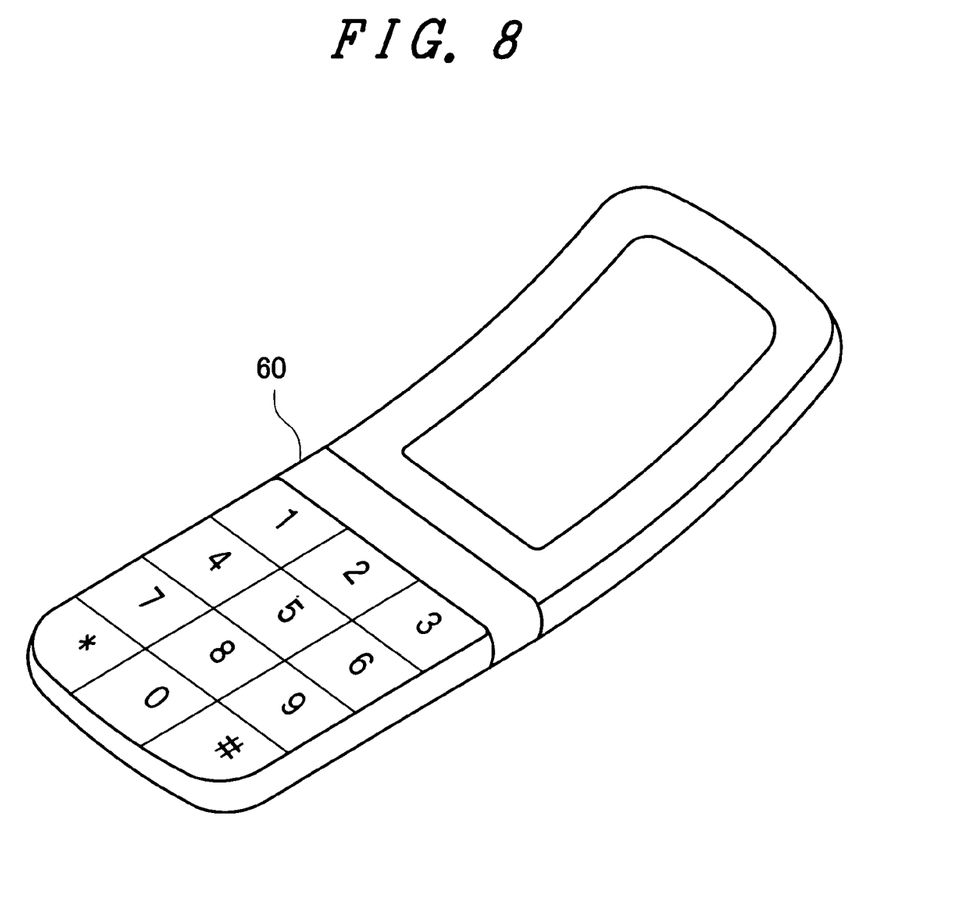
FIG. 8 is a view showing the appearance of a cell phone using a screen of a curved surface of an embodiment 2.

FIG. 8 illustrates an example of when the liquid crystal display device having a curved screen which is convex outwards of the invention is used for a cell phone 60. Even a small display like that of the cell phone 60 gives good legibility upon imparting a particular curvature to the screen. Since the screen is small, further, the curved screen little affects the thickness of the display.

Figure 9:
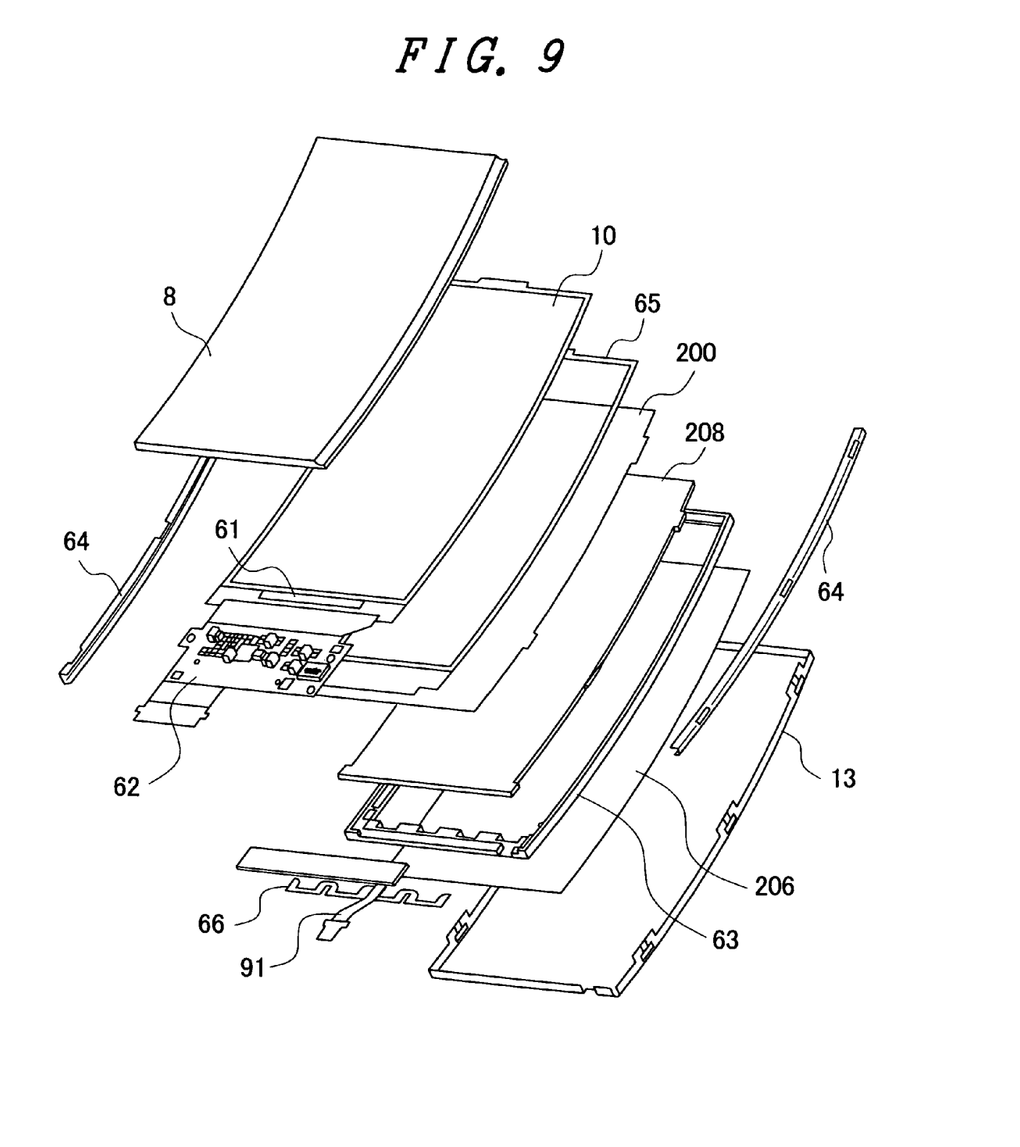
FIG. 9 is a disassembled perspective view of the cell phone of the embodiment 2.

FIG. 9 is a disassembled perspective view of the liquid crystal display device used in FIG. 8. In FIG. 9, the transparent surface cover 8 is set to a side frame 64. Upon being set to a groove of the side frame 64, the surface cover 8 forms a particular curved surface. A curvature may be imparted to the surface cover 8 in advance. The surface cover 8 can be easily formed to assume a curved surface since it is formed by using a transparent plastic material.

A liquid crystal display panel 10 is arranged under a transparent surface cover 8. The liquid crystal display panel 10 is formed as a flat panel and, thereafter, the TFT substrate 101 and the color filter substrate 102 are polished to assume decreased thicknesses. Upon decreasing the thickness of the liquid crystal display panel 10, the display surface of the liquid crystal display panel 10 easily complies with the curved surface formed by the surface cover 8.

The TFT substrate 101 in the liquid crystal display panel 10 is formed to be larger than the color filter substrate 102. A driver chip 61 is arranged on the TFT substrate 101, and a flexible wiring board 62 is connected to the liquid crystal display panel 10 to feed power supply, signals, etc. thereto from the external units. Though not shown, the liquid crystal display panel 10 includes the upper polarizer plate 103 and the lower polarizer plate 104 arranged therein being partly adhered thereto. The method of adhesion is the same as that of FIG. 6.

A light-shielding tape 65 is arranged under the liquid crystal display panel 10 along the circumference thereof in order to prevent a decrease in the contrast caused by the leakage of light from the back light 20 to the circumference of the liquid crystal display panel 10. Optical sheets 200 are arranged under the light-shielding tape 65. In FIG. 9, the optical sheets 200 are drawn as a piece of sheet. In practice, however, the upper diffusing sheet 201, upper prism sheet 202, lower prism sheet 203 and lower diffusing sheet 204 are arranged like those shown in FIG. 4. The roles of the sheets are as described in Example 1. In FIG. 9, however, the optical sheets are bent in a direction opposite to that of FIG. 4.

A light guide plate 208 is arranged under the optical sheets 200. The upper surface of the light guide plate 208 is forming a curved surface the same as that of the screen of the liquid crystal display panel 10. The optical sheets are arranged along the curved surface which is the upper surface of the light guide plate 208. Therefore, the optical sheets, too, assume the same curved surface as that of the screen of the liquid crystal display panel 10. A flexible wiring board 91 for LED 9 mounting an LED 9 is arranged on the side surface of the light guide plate 208. In FIG. 9, light is fed from the LED 9 through the short side of the light guide plate 208. A light-shielding tape 66 for the source of light is arranged under the LED flexible wiring board 91 to prevent the leakage of light from the LED 9.

These optical members are held in a mold 63 formed of a resin. A reflecting sheet 206 is arranged under the mold 63. Light from the LED 9 heading toward the side opposite to the liquid crystal display panel 10 is reflected by the reflecting sheet 206 so as to travel toward the liquid crystal display panel 10. The liquid crystal display panel 10 and the back light 20 are held by the back cover 13 formed of a metal.

The curved screen of the liquid crystal display panel 10 of this embodiment can be easily formed if it is of a cylindrical shape. In this case, the direction to which the curvature is imparted is the direction of long axis of the screen. The screen in this embodiment has a diagonal size of 2.75 inches and a radius of curvature of the curved surface of, for example, about 185 mm in the direction of long axis. Though the curvature is small, the effect on the legibility is very great. Further, despite the curvature is imparted, the screen is so small as to very little affect the thickness of the liquid crystal display device.

The TFT substrate 101 and the color filter substrate 102 in this embodiment have a thickness of 0.15 mm, respectively, and the liquid crystal display panel 10 as a whole has a thickness of 0.3 mm. As shown in the graph of FIG. 2A, if the liquid crystal display panel 10 has a thickness of 0.3 mm, the radius of curvature of 185 mm can be formed maintaining a margin. Even if the screen is curved, the thickness of the liquid crystal display device of this embodiment, i.e., the total thickness of the liquid crystal display panel 10 and the back light 20 can be suppressed to be about 2 mm.

In FIG. 9, the surface cover 8 is arranged on the liquid crystal display panel 10. As shown in FIG. 6, however, the upper polarizer plate may be partly adhered to the liquid crystal display panel 10, and the groove may be suitably formed in the side frame 64 to omit the surface cover 8.

Figure 10:
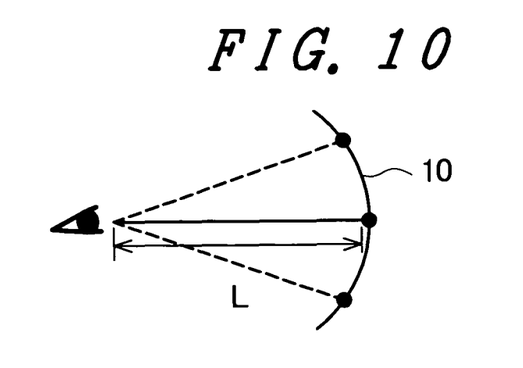
FIG. 10 is a view schematically illustrating a case of viewing a screen of a concave shape.

FIG. 10 is a schematic view for evaluating a suitable radius of curvature of a screen of a device held by hand, such as the cell phone 60. The cell phone 60 is held by hand to watch the display screen. It is considered the distance between the eyes and the screen is roughly from about 20 cm to about 30 cm. Therefore, if the display is a concave screen having a radius of about 15 cm to about 40 cm, the legibility can be strikingly improved. The direction in which the curvature is imparted may be either the direction of long axis or the direction of short axis of the screen. However, the legibility is effectively improved if the curvature is imparted in the direction of long axis.

According to the invention as described above, the liquid crystal display device having a curved display surface can be easily formed. Besides, the TFT substrate 101 and the color filter substrate 102 in the liquid crystal display panel 10 use the traditional glass substrates offering excellent reliability.

[Embodiment 3]

Embodiments 1 and 2 have dealt with the cases where the glass substrates were polished to decrease the thicknesses thereof to impart curvature thereto. Referring to FIG. 2A, on the other hand, when the display surface has a sufficiently large radius of curvature, the curvature can be imparted without the need of decreasing the thicknesses of the glass substrates by polishing. From FIG. 2A, for example, if the radius of curvature is not smaller than one meter, a curved surface can be formed by the invention even if the liquid crystal display panel 10 has a thickness of about 1 mm. Such a large curvature may be that of the case of a liquid crystal display device for use with TVs.

When such a large curvature is to be imparted as in this embodiment, the thicknesses of the TFT substrate 101 and the color filter substrate 102 can be decreased to be about 0.5 mm, respectively, even when the surface of the liquid crystal display panel 10 is to be curved by the frame 11 and the light guide plate 208 of back light 20. Therefore, the upper polarizer plate 103 can be stuck to the color filter substrate 102 and the lower polarizer plate 104 can be stuck to the TFT substrate 101.

Figure 11:
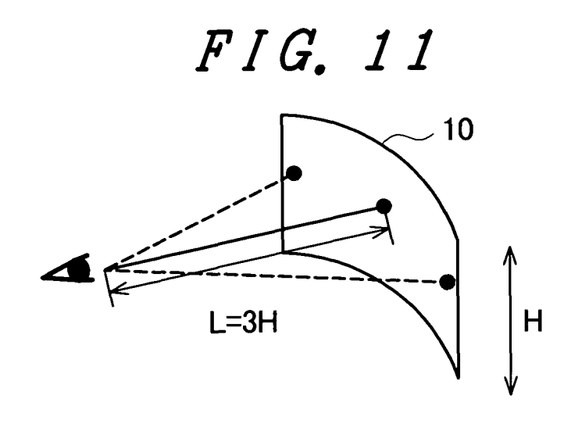
FIG. 11 is a view schematically illustrating a case of viewing a TV screen of the concave shape.

FIG. 11 is a view illustrating a case of when the display is that of a TV. In FIG. 11, the liquid crystal display panel 10 constituting the display has a curved surface of an outwardly concave shape. An optimum position for watching the TV is considered to be away from the screen by a distance equal to 2 to 4 times the vertical length H of the screen. FIG. 11 shows an example where a man is watching the TV at a position away from the screen by a distance equal to 3 times the vertical length H of the screen.

When the TV is watched from this position, any part of the screen can be viewed as vividly as when viewing the center of the screen provided the radius of curvature of the screen is 3H. In the case of the liquid crystal display panel 10, the viewing angle range characteristics do not so vary in the up-and-down direction of the screen as in the horizontal direction thereof. Therefore, the curvature may be imparted in the horizontal direction of the screen. That is, the constitution of the invention is very suited for the liquid crystal TVs by forming the screen to assume a cylindrically curved surface by, first, forming the flat liquid crystal display panel 10 and, thereafter, having the liquid crystal display panel 10 comply with the frame 11 forming a curved surface.

In the case of, for example, a 37-inch TV having an aspect ratio of 16:9, the screen has a vertical length of 46 cm. Then, the position of 3H is about 1.4 m. If the screen has a radius of curvature of 1400 mm, therefore, a good image can be obtained over the whole screen. On the other hand, if it is considered that an optimum position for watching the TV is away from it by 4 times of the vertical length H of the screen, i.e., the position of 4H is an optimum position, then the radius of curvature of the screen in the horizontal direction may be set to be 4H. In the case of, for example, the 37-inch TV, a radius of curvature of about 1870 mm may be imparted thereto.

What is claimed is:

1. A liquid crystal display device comprising a TFT substrate forming pixel electrodes and TFTs, a color filter substrate forming a color filter, a liquid crystal display panel of which the liquid crystals hare sandwiched between the color filter substrate and the TFT substrate, a frame covering the peripheries of the liquid crystal display panel to hold the liquid crystal display panel, and a back light; wherein the frame has a curved surface, and the liquid crystal display panel has a curved surface defined by the curved surface of the frame, the TFT substrate and the color filter substrate are formed of a glass, an upper polarizer plate is sandwiched between the color filter substrate and the frame, the upper polarizer plate being fixed via a first adhering member to the color filter substrate only at a first outer edge portion of the color filter substrate, and a lower polarizer plate is sandwiched between the TFT substrate and the back light, the lower polarizer plate being fixed via a second adhering member to the TFT substrate only at a first outer edge portion of the TFT substrate, the color filter substrate has a second outer edge portion which is on an opposite side of the first outer edge portion thereof, the TFT substrate has a second outer edge portion which is on an opposite side of the first outer edge portion thereof, the upper polarizer plate is not fixed to the second outer edge portion of the color filter substrate, and the lower polarizer plate is not fixed to the second outer edge portion of the TFT substrate.

2. The liquid crystal display device as set forth in claim 1, wherein the back light has a light guide plate or a diffusing plate and optical sheets, a dented portion is formed in the light guide plate or in the diffusing plate, the optical sheets are held in the dented portion, and a curved surface of the dented portion on the side facing the liquid crystal display panel is in agreement with the curved surface of the liquid crystal display panel.

3. The liquid crystal display device as set forth in claim 1, wherein when the thickness of the liquid crystal display panel is denoted by t, the radius of curvature R of the curved surface of the liquid crystal display panel has a relationship R>400t.

4. The liquid crystal display device as set forth in claim 1, wherein when the thickness of the liquid crystal display panel is denoted by t, the radius of curvature R of the curved surface of the liquid crystal display panel has a relationship R>800t.

5. The liquid crystal display device as set forth in claim 1, wherein a transparent surface cover is arranged between the frame and the liquid crystal display panel to cover the liquid crystal display panel.

* * * * *